(12) United States Patent
Wang et al.

(10) Patent No.: US 7,590,790 B2
(45) Date of Patent: Sep. 15, 2009

(54) BUS DEVICE

(75) Inventors: Jar-Haur Wang, Taipei (TW); Ben Lai, Taipei (TW)

(73) Assignee: Via Technologies, Inc., Shindian, Taipei (TW)

( * ) Notice: Subject to any disclaimer, the term of this patent is extended or adjusted under 35 U.S.C. 154(b) by 173 days.

(21) Appl. No.: 11/457,368

(22) Filed: Jul. 13, 2006

(65) Prior Publication Data
US 2007/0162679 A1 Jul. 12, 2007

(30) Foreign Application Priority Data
Jul. 13, 2005 (TW) .............................. 94123805 A

(51) Int. Cl.
*G06F 13/36* (2006.01)
(52) U.S. Cl. .................... 710/315; 710/71; 710/105; 710/306; 710/308
(58) Field of Classification Search ............... 710/8, 710/11, 14, 22, 62, 64, 71, 72, 105, 306, 710/308, 311, 313
See application file for complete search history.

(56) References Cited
U.S. PATENT DOCUMENTS

| | | | | |
|---|---|---|---|---|
| 5,596,562 A | * | 1/1997 | Chen | 710/315 |
| 6,434,648 B1 | * | 8/2002 | Assour et al. | 710/305 |
| 6,434,660 B1 | * | 8/2002 | Lambert et al. | 711/103 |
| 6,813,688 B2 | * | 11/2004 | Wu et al. | 711/114 |
| 7,069,369 B2 | * | 6/2006 | Chou et al. | 710/301 |
| 7,130,958 B2 | * | 10/2006 | Chou et al. | 711/103 |
| 7,152,135 B2 | * | 12/2006 | Chou | 710/315 |
| 2003/0074515 A1 | | 4/2003 | Resnick | |
| 2003/0191874 A1 | | 10/2003 | Drescher et al. | |
| 2005/0120150 A1 | | 6/2005 | Lissel et al. | |
| 2005/0251674 A1 | * | 11/2005 | Wang et al. | 713/2 |
| 2007/0016702 A1 | * | 1/2007 | Pione et al. | 710/62 |

* cited by examiner

*Primary Examiner*—Khanh Dang
(74) *Attorney, Agent, or Firm*—Kirton & McConkie; Evan R. Witt

(57) ABSTRACT

A bus device is used with a computer system. In the bus device, a bus-interfaced host performs data transmission in a first mode in response to a first command resulting from certain software execution of the computer system. A bridge device is coupled to and communicable with the bus-interfaced host via a first interface according to a first transmission protocol, and coupled to and communicable with the bus-interfaced device via a second interface according to a second transmission protocol. A bus-interfaced device performs data transmission in a second mode different from the first mode in response to a second command resulting from certain modification of the first command.

20 Claims, 5 Drawing Sheets

BUS DEVICE

FIELD OF THE INVENTION

The present invention relates to a bus device for use with a computer system, and more particularly to a bus device with automatic conditioning function.

BACKGROUND OF THE INVENTION

According to the specification of a previously developed ATA (Advanced Technology Attachment) interface, the command set only supports the access to a non-extractable storage device while the access to an extractable storage device is not imparted. Due to the development of removable storage device and practical needs, an Advanced Technology Attachment Packet Interface (hereinafter "ATAPI") is developed with a specification of Advanced Technology Attachment with Packet Interface Extension (hereinafter "ATA/ATAPI"). The ATA/ATAPI whose command set permits access to extractable storage devices has become the mot common interface specification nowadays for the communication of magnetic disc drives, hard disc drives and optical disc drives with a computer system.

Furthermore, the ATA/ATAPI incorporates therein a Serial ATA (SATA) specification. A conventional Parallel ATA (PATA) specification, after making a brilliant history, has been found several serous design problems for current chip designers. These problems include requirements of 5 volts signals, a large number of pins and complicated bus means. The SATA interface is then developed to solve the above-mentioned problems. The SATA interface allows the number of storage interfaces to grow with the development of PC platforms and is compactable with current operating systems and drivers. In addition, it can work with lowered voltage, reduced pin number and simplified bus means. Moreover, the SATA interface provides enhanced transfer rate. It is expected that next generation of SATA specification will have a higher transfer rate, which may be up to double.

Nevertheless, as SATA interface is a newly stipulated specification and there are still peripherals operated with PATA interfaces, a bridge chip for coordinating the SATA interface and the PATA interface is developed. FIG. 1 illustrates a typical disposition of a bridge chip between a SATA-interfaced host and a PATA-interfaced device. In response to a software command, the SATA-interfaced host 10 undergoes data transmission to/from the bridge chip 11 according to the SATA specification. On the other hand, the bridge chip 11 is capable of transmitting data to/from the PATA-interfaced device 12 according to the PATA specification. In this way, it is possible to communicate the SATA-interfaced host 10 with the PATA-interfaced device 12 via the bridge chip 11.

In the ATA/ATAPI specification, transmission in a Programmed I/O mode (PIO mode) and transmission in a Direct Memory Access mode (DMA mode) are recited. In the PIO mode, the ATA/ATAPI-interfaced device accesses to a memory and perform associated operations under the essential control of the CPU. In the DMA mode, on the other hand, similar operations can be performed by the ATA/ATAPI-interfaced host controller and the drivers without the management of the CPU. Consequently, unlike the PIO mode, transmission in the DMA mode need not interrupt the CPU for data transmission. However, not all ATA/ATAPI-interfaced devices support the DMA mode. For example, referring to FIG. 1, when the computer system executes certain software so as to issue a read/write command but the PATA-interfaced device 12 does not support the DMA mode, the PATA-interfaced device 12 will terminate the execution of the read/write command while sending an error message to the SATA-interfaced host 10 in response. Accordingly, the SATA-interfaced host 10 resends a substitutive read/write command for the slower PIO mode data transmission. Such a process will remarkably reduce the performance of the entire system.

SUMMARY OF THE INVENTION

An embodiment of the present invention provides a bus device for use with a computer system. The bus device includes a bus-interfaced host performing data transmission in a first mode in response to a first command resulting from certain software execution of the computer system; a bridge device coupled to and communicable with the bus-interfaced host via a first interface according to a first transmission protocol, and coupled to and communicable with the bus-interfaced device via a second interface according to a second transmission protocol; and a bus-interfaced device performing data transmission in a second mode different from the first mode in response to a second command resulting from certain modification of the first command.

In another embodiment of the present invention, a bus device is used with a computer system, and includes a bus-interfaced host performing data transmission in a first mode according to a first transmission protocol in response to a first command resulting from certain software execution of the computer system; a bridge device coupled to the bus-interfaced host for converting the first transmission protocol into the second transmission protocol and modifying the first command into a second command; and a bus-interfaced device performing data transmission in a second mode according to a second transmission protocol in response to the second command.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
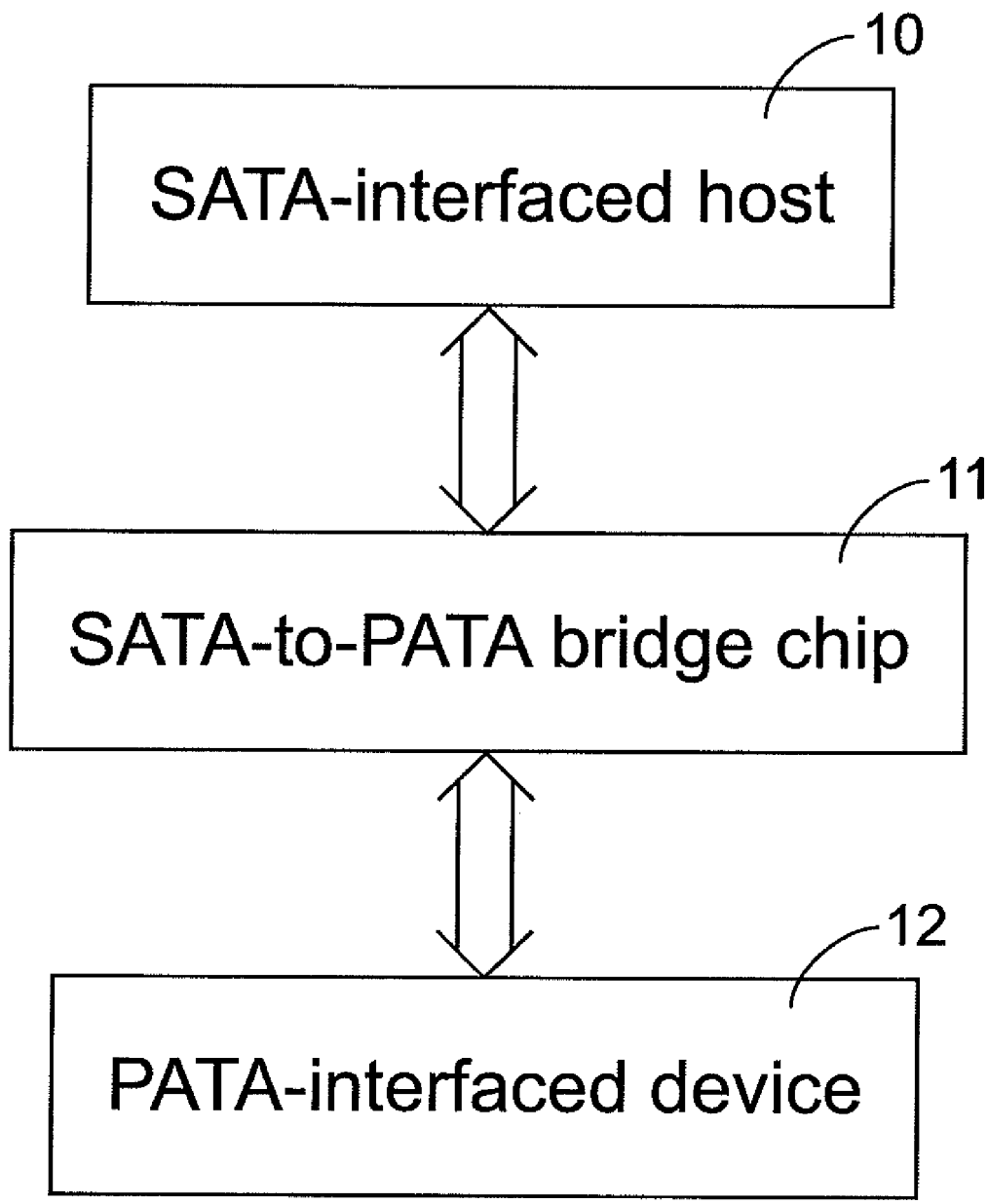
FIG. 1 is a functional block diagram schematically illustrating a bus device wherein a SATA-interfaced host is communicable with a PATA-interfaced device via a bridge chip.
Figure 2:
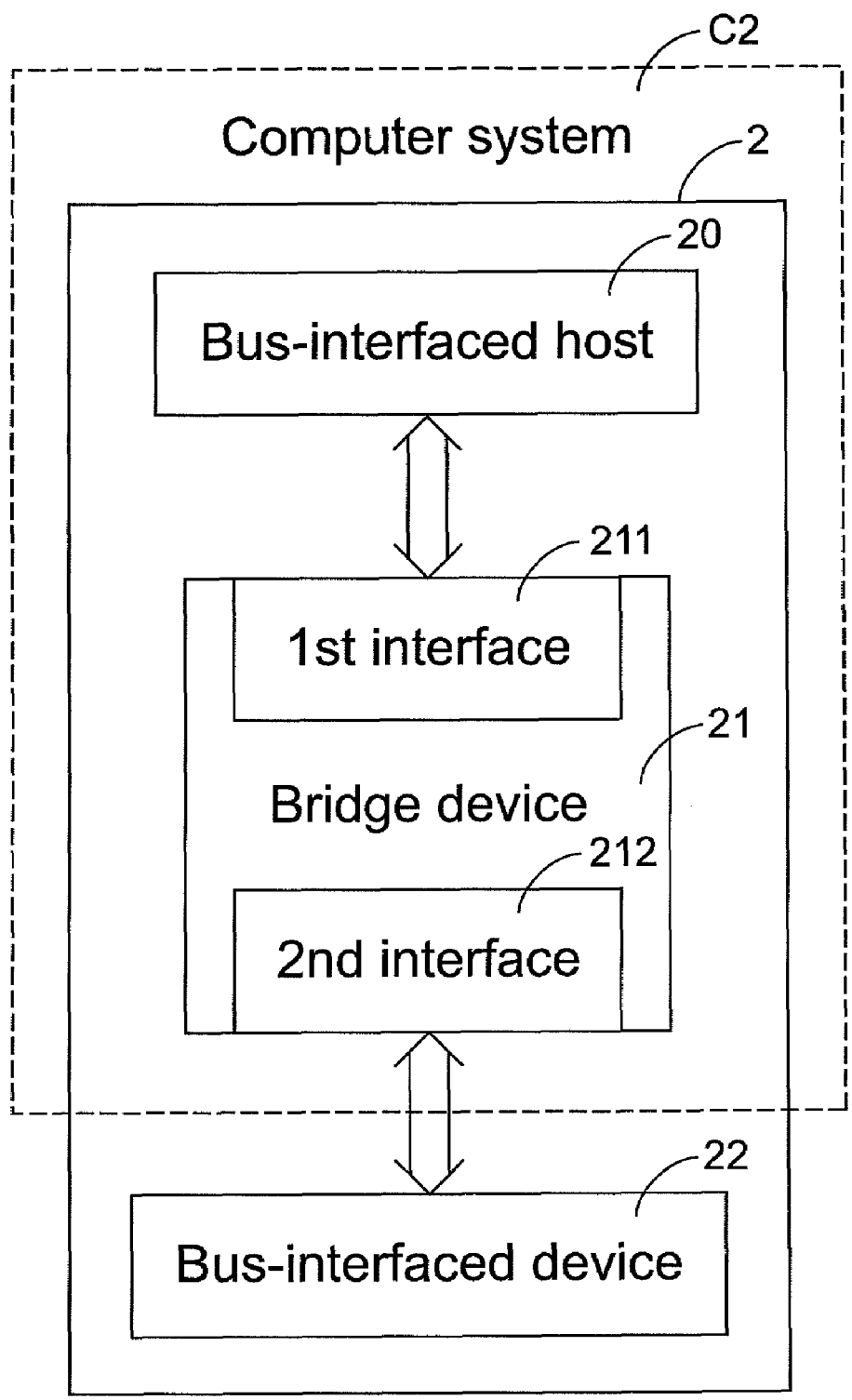
FIG. 2 is a functional block diagram schematically illustrating a bus device according to an embodiment of the invention.

In the embodiment of FIG. 2, the bus device 2 of the present invention is used with a computer system C2. The bus device 2 includes a bus-interfaced host 20, a bridge device 21 and a bus-interfaced device 22. The bus-interfaced host 20 can be but not have to be integrated into a south bridge chip of the computer system C2. The bridge device 21 is coupled to the bus-interfaced host 20 via a first interface 211 and coupled to the bus-interfaced device 22 via a second interface 212. In this embodiment, the bus-interfaced host 20 and the bus-interfaced device 22 can work in different modes and/or under different transmission protocols. For example, the bus-interfaced host 20 complies with a first transmission protocol, and the data transmission between the bus-interfaced host 20 and the bridge device 21 via the first interface 211 is performed in a first mode. On the other hand, the bus-interfaced device 22 complies with a second transmission protocol, and the data transmission between the bus-interfaced device 22 and the bridge device 21 via the second interface 212 is performed in a second mode. For conducting such communication, the bridge device 21 modifies the software command received from the computer system C2 for first-mode data transmission between the bus-interfaced host 20 and the bridge chip 21 according to the first transmission protocol into a software command for second-mode data transmission between the bus-interfaced device 22 and the bridge device 21 according to the second transmission protocol. The term "software command" used herein and hereinafter means a command issued by executing certain software in the computer system. Certainly, the bus-interfaced host 20 and the bus-interfaced device 22 can also work in the same modes.

Figure 3:
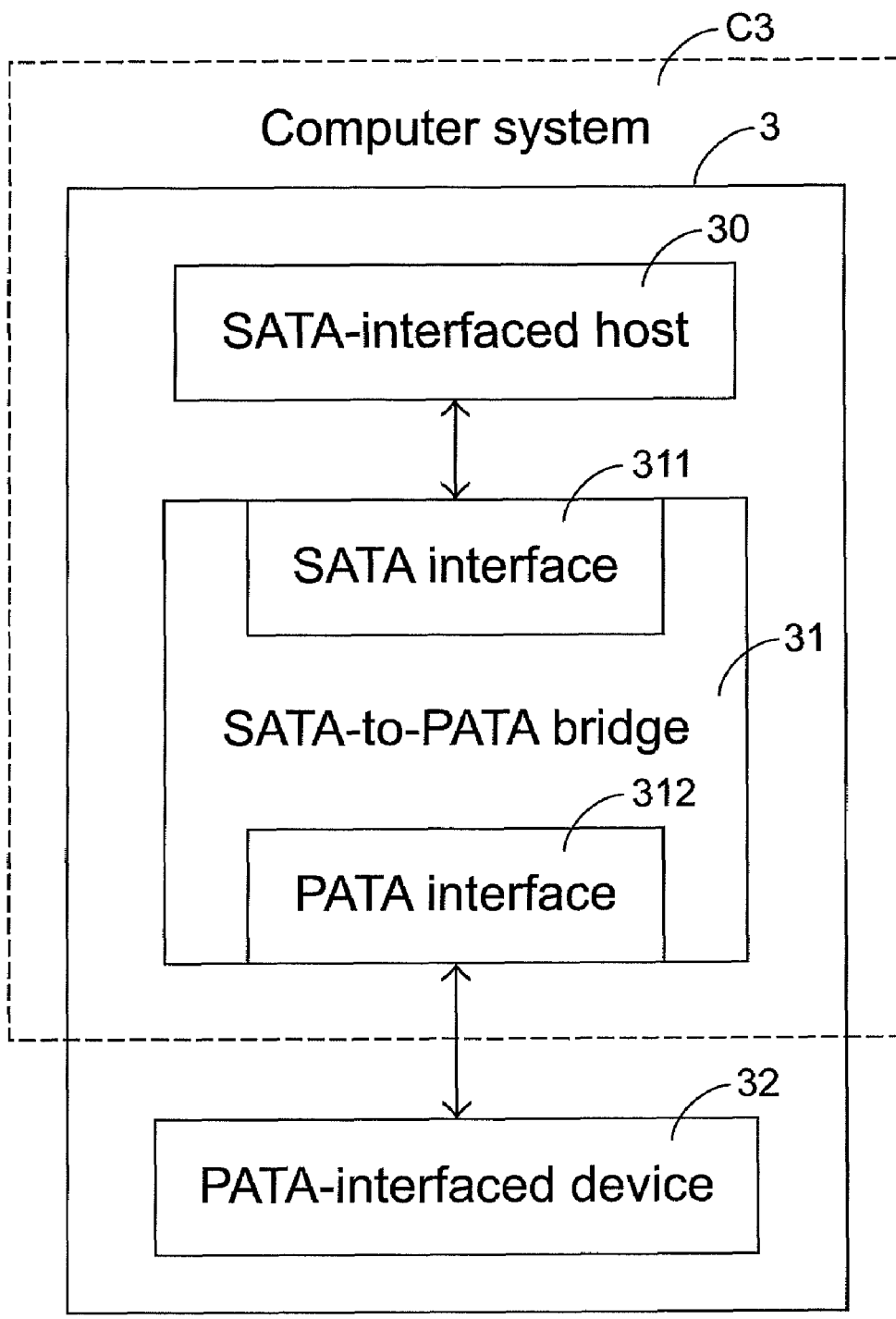
FIG. 3 is a functional block diagram schematically illustrating a first example of the bus device of FIG. 2.

Hereinafter, examples are given to describe the practical uses of the embodiment of FIG. 2. In the example of FIG. 3, the first transmission protocol and the second transmission protocol are SATA transmission protocol and PATA transmission protocol, respectively, and the first mode and the second mode are DMA mode and PIO mode, respectively. Accordingly, the bus device 3 includes a SATA-interfaced host 30, a SATA-to-PATA bridge 31 and a PATA-interfaced device 32. The bus-interfaced host 20 of FIG. 2 is implemented with a SATA-interfaced host 30, and the bus-interfaced device 22 of FIG. 2 is implemented with a PATA-interfaced device 32. The bridge device 21 of FIG. 2 is thus implemented with a SATA-to-PATA bridge 31. The SATA-to-PATA bridge 31 can be formed as an independent chip. Alternatively, it can be integrated into the south bridge chip along with the SATA-interfaced host 30 or designed as other suitable forms. In this example, the PATA-interfaced device 32 supports the PIO mode but do not support the DMA mode. Therefore, after the data transmission performed between the SATA-interfaced host 30 and the bridge 31 via the SATA interface 311 in response to the software command from the computer system C3 is in the DMA mode according to the SATA transmission protocol, a bit of the software command representing the DMA mode is modified, for example from "1" to "0", to form a modified command. In response to the modified command, the data transmission between the PATA-interfaced device 32 and the bridge 31 via the PATA interface 312 is performed in the PIO mode according to the PATA transmission protocol.

In an extensive example that the PATA device 32 is capable of supporting the DMA mode, the present invention allows the data transmission between the PATA-interfaced device 32 and the bridge 31 to be performed in the DMA mode no matter whether the data transmission performed between the SATA-interfaced host 30 and the bridge 31 is performed in the PIO mode or DMA mode. It is advantageous in a higher transmission rate of the DMA mode. In other words, when the data transmission performed between the SATA-interfaced host 30 and the bridge 31 via the SATA interface 311 in response to the software command from the computer system C3 is in the PIO mode according to the SATA transmission protocol, a bit of the software command representing the PIO mode is modified, for example from "0" to "1", to form a modified command. In response to the modified command, the data transmission between the PATA-interfaced device 32 and the bridge 31 via the PATA interface 312 is performed in the DMA mode according to the PATA transmission protocol.

Consequently, with the mode-converting functions of the bridge 31, for example by way of modifying a bit of the command, no error message would be issued to have the host end resend a command due to inconsistent transmission modes. Certainly, the SATA-interfaced host 30 and PATA-interfaced device 32 can also work in the same modes by remaining the command unmodified. Therefore, both the SATA-interfaced host 30 and PATA-interfaced device 32 can work under respective best transmission modes. The performance of the bus device can thus be improved.

Figure 4:
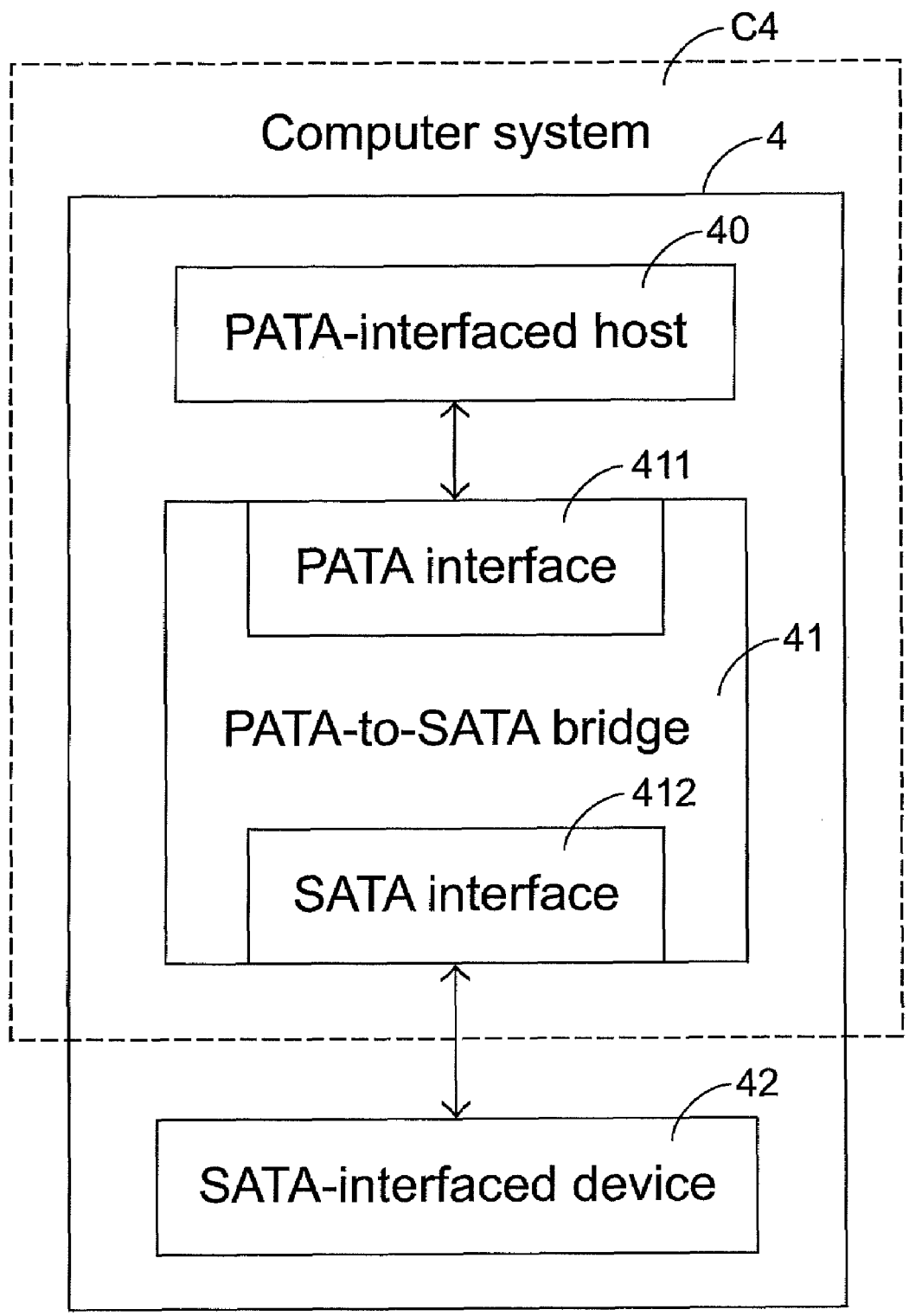
FIG. 4 is a functional block diagram schematically illustrating a second example of the bus device of FIG. 2.

Another example is illustrated in FIG. 4 wherein the first transmission protocol and the second transmission protocol are PATA transmission protocol and SATA transmission protocol, respectively, and the first mode and the second mode are DMA mode and PIO mode, respectively. Accordingly, the bus device 4 includes a PATA-interfaced host 40, a PATA-to-SATA bridge 41 and a SATA-interfaced device 42. The bus-interfaced host 20 of FIG. 2 is implemented with a PATA-interfaced host 40, and the bus-interfaced device 22 of FIG. 2 is implemented with a SATA-interfaced device 42. The bridge device 21 of FIG. 2 is thus implemented with a PATA-to-SATA bridge 41. The PATA-to-SATA bridge 41 can be formed as an independent chip. Alternatively, it can be integrated into the south bridge chip along with the PATA-interfaced host 40 or designed as other suitable forms. In this example, the SATA-interfaced device 42 supports the PIO mode but do not support the DMA mode. Therefore, after the data transmission performed between the PATA-interfaced host 40 and the bridge 41 via the PATA interface 411 in response to the software command from the computer system C4 is in the DMA mode according to the PATA transmission protocol, a bit of the software command representing the DMA mode is modified, for example from "1" to "0", to form a modified command. In response to the modified command, the data transmission between the SATA-interfaced device 42 and the bridge 41 via the SATA interface 412 is performed in the PIO mode according to the SATA transmission protocol.

In an extensive example that the SATA device 42 is capable of supporting the DMA mode, the present invention allows the data transmission between the SATA-interfaced device 42 and the bridge 41 to be performed in the DMA mode no matter whether the data transmission performed between the PATA-interfaced host 40 and the bridge 41 is performed in the PIO mode or DMA mode. It is advantageous in a higher transmission rate of the DMA mode. In other words, when the data transmission performed between the PATA-interfaced host 40 and the bridge 41 via the PATA interface 411 in response to the software command from the computer system C4 is in the PIO mode according to the PATA transmission protocol, a bit of the software command representing the PIO mode is modified, for example from "0" to "1", to form a modified command. In response to the modified command, the data transmission between the SATA-interfaced device 42 and the bridge 41 via the SATA interface 412 is performed in the DMA mode according to the SATA transmission protocol.

Consequently, with the mode-converting functions of the bridge 31, for example by way of modifying a bit of the command, no error message would be issued to have the host end resend a command due to inconsistent transmission modes. Certainly, the PATA-interfaced host 40 and SATA-interfaced device 42 can also work in the same modes by remaining the command unmodified. Therefore, both the PATA-interfaced host 40 and SATA-interfaced device 42 can work under respective best transmission modes. The performance of the bus device can thus be improved.

Figure 5:
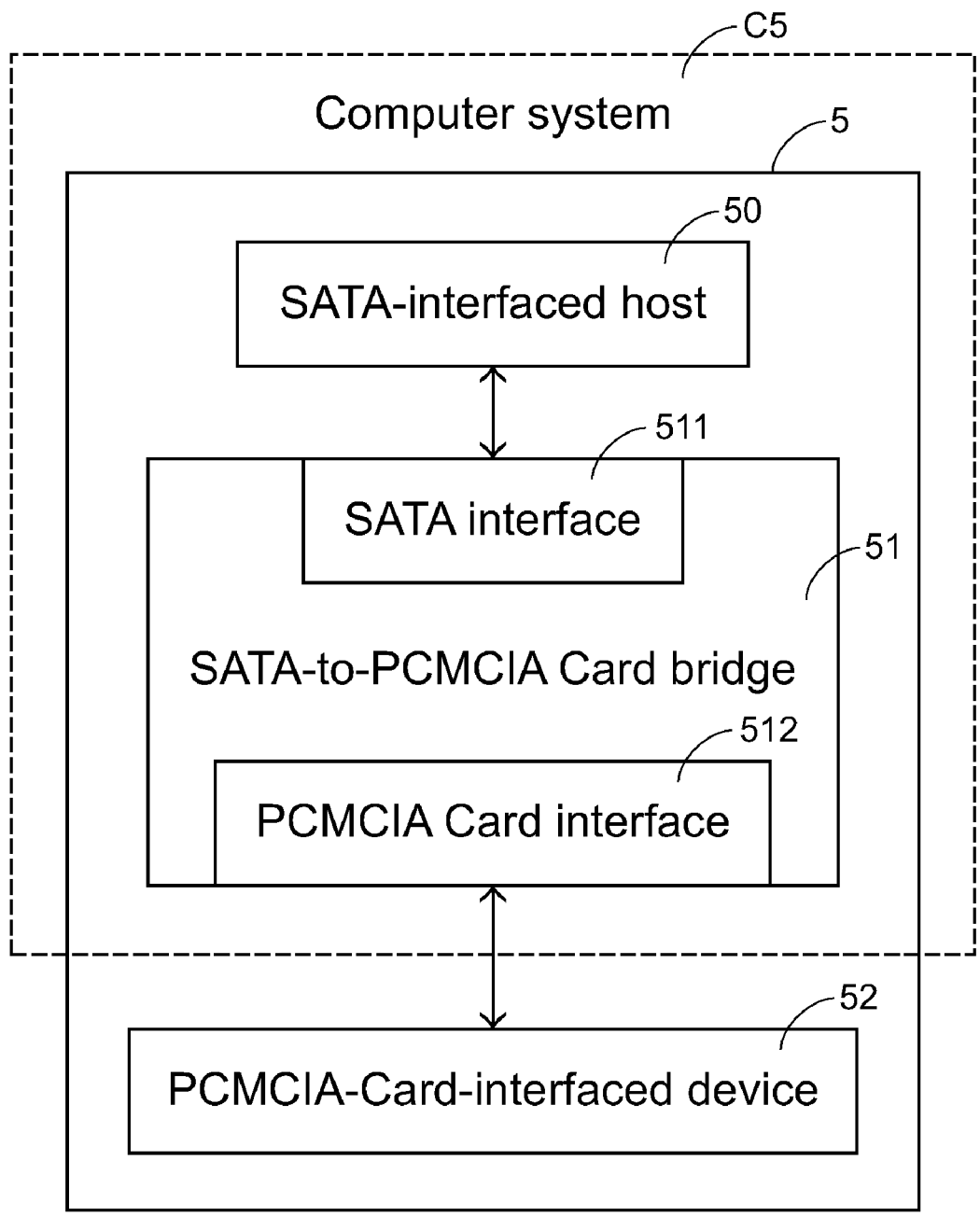
FIG. 5 is a functional block diagram schematically illustrating a third example of the bus device of FIG. 2.

FIG. 5 illustrates a further example wherein the first transmission protocol and the second transmission protocol are SATA transmission protocol and PCMCIA Card transmission protocol, respectively, and the first mode and the second mode are DMA mode and PIO mode, respectively. Accordingly, the bus device 5 includes a SATA-interfaced host 50, a SATA-to-PCMCIA Card bridge 51 and a PCMCIA-Card-interfaced device 52. The bus-interfaced host 20 of FIG. 2 is implemented with a SATA-interfaced host 50, and the bus-interfaced device 22 of FIG. 2 is implemented with a PCMCIA-Card-interfaced device 52. The bridge device 21 of FIG. 2 is thus implemented with a SATA-to-PCMCIA Card bridge 51. In this example, the PCMCIA-Card-interfaced device 52 supports ATAPI commands and the PIO mode but do not support the DMA mode. Therefore, after the data transmission performed between the SATA-interfaced host 50 and the bridge 31 via the SATA interface 511 in response to the software command from the computer system C5 is in the DMA mode according to the SATA transmission protocol, a bit of the software command representing the DMA mode is modified, for example from "1" to "0", to form a modified command. In response to the modified command, the data transmission between the PCMCIA-Card-interfaced device 52 and the bridge 51 via the PCMCIA Card interface 512 is performed in the PIO mode according to the PCMCIA Card transmission protocol. In addition to the PCMCIA-Card-interfaced device 52, the bus-interfaced device 22 of FIG. 2 can be any other suitable memory-card-interfaced device, e.g. compact-flash-card-interfaced device. Then, of course, the bridge 21 of FIG. 2 should do corresponding conversion, i.e. from SATA transmission protocol to Compact-Flash-Card transmission protocol.

In an extensive example that the PCMCIA-Card-interfaced device 52 is capable of supporting the DMA mode, the present invention allows the data transmission between the PCMCIA-Card-interfaced device 52 and the bridge 51 to be performed in the DMA mode no matter whether the data transmission performed between the SATA-interfaced host 50 and the bridge 51 is performed in the PIO mode or DMA mode. It is advantageous in a higher transmission rate of the DMA mode. In other words, when the data transmission performed between the SATA-interfaced host 50 and the bridge 51 via the SATA interface 511 in response to the software command from the computer system C5 is in the PIO mode according to the PATA transmission protocol, a bit of the software command representing the PIO mode is modified, for example from "0" to "1", to form a modified command. In response to the modified command, the data transmission between the PCMCIA-Card-interfaced device 52 and the bridge 51 via the PCMCIA Card interface 512 is performed in the DMA mode according to the PCMCIA Card transmission protocol.

Consequently, with the mode-converting functions of the bridge 31, for example by way of modifying a bit of the command, no error message would be issued to have the host end resend a command due to inconsistent transmission modes. Certainly, the SATA-interfaced host 50 and PCMCIA-Card-interfaced device 52 can also work in the same modes by remaining the command unmodified. Therefore, both the SATA-interfaced host 50 and PCMCIA-Card-interfaced device 52 can work under respective best transmission modes. The performance of the bus device can thus be improved.

To sum up, the bus device according to the present invention has an automatic conditioning function so as to allow the bus-interfaced host and the bus-interfaced device to work under different modes and different transmission protocols. As such, respective best modes of the bus-interfaced host and the bus-interfaced device, e.g. highest transmission rates, can be performed to improve the performance of the bus device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bus device for use with a computer system, comprising:
   a bus-interfaced host performing data transmission in a first mode in response to a first command resulting from certain software execution of the computer system;
   a bus-interfaced device supporting a second mode different from the first mode for data transmission; and
   a bridge device coupled to and communicable with the bus-interfaced host via a first interface according to a first transmission protocol, coupled to and communicable with the bus-interfaced device via a second interface according to a second transmission protocol, and modifying a bit of the first command to form a second command so as to continue the data transmission via the bus-interfaced device in the second mode.

2. The bus device according to claim 1 wherein the first mode and the second mode are a DMA mode and a PIO mode, respectively.

3. The bus device according to claim 1 wherein the first mode and the second mode are a PIO mode and a DMA mode, respectively.

4. The bus device according to claim 1 wherein the bus-interfaced device performing data transmission in the first mode when the first command remains unmodified.

5. The bus device according to claim 1 wherein the first transmission protocol is selected from a group consisting of a Serial ATA transmission protocol and a Parallel ATA transmission protocol.

6. The bus device according to claim 1 wherein the second transmission protocol is selected from a group consisting of a Serial ATA transmission protocol, a Parallel ATA transmission protocol, a PCMCIA-Card transmission protocol and a Compact-Flash-Card transmission protocol.

7. The bus device according to claim 1 wherein the first command is modified to form the second command by changing a bit of the command from "0" to "1" or from "1" to "0".

8. The bus device according to claim 1 wherein the bridge device is formed as an independent chip.

9. The bus device according to claim 1 wherein the bridge device and the bus-interfaced host are integrated into a south bridge chip of the computer system.

10. A bus device for use with a computer system, comprising:
    a bus-interfaced host performing data transmission in a first mode according to a first transmission protocol in response to a first command resulting from certain software execution of the computer system;
    a bridge device coupled to the bus-interfaced host for converting the first transmission protocol into a second transmission protocol; and
    a bus-interfaced device performing data transmission according to the second transmission protocol;
    wherein the bridge device determines whether the bus-interfaced device supports a second mode different from the first mode, and modifies a bit of the first command to form a second command to have the bus-interfaced device continue the data transmission in the second mode according to the second transmission protocol.

11. The bus device according to claim 10 wherein the first mode and the second mode are a DMA mode and a PTO mode, respectively.

12. The bus device according to claim 10 wherein the first mode and the second mode are a PTO mode and a DMA mode, respectively.

13. The bus device according to claim 10 wherein the first transmission protocol and the second transmission protocol are a Serial ATA transmission protocol and a Parallel ATA transmission protocol, respectively.

14. The bus device according to claim 10 wherein the first transmission protocol and the second transmission protocol are a Parallel ATA transmission protocol and a Serial ATA transmission protocol, respectively.

15. The bus device according to claim 10 wherein the first transmission protocol and the second transmission protocol are a Serial ATP transmission protocol and a PCMCIA-Card transmission protocol, respectively.

16. The bus device according to claim 10 wherein the first transmission protocol and the second transmission protocol are a Serial ATA transmission protocol and a Compact-Flash-Card transmission protocol, respectively.

17. The bus device according to claim 10 wherein a bit of the command is modified from "0" to "1" to obtain the second command.

18. The bus device according to claim 10 wherein a bit of the command is modified from "1" to "0" to obtain the second command.

19. The bus device according to claim 10 wherein the bridge device is formed as an independent chip.

20. The bus device according to claim 10 wherein the bridge device and the bus-interfaced host are integrated into a south bridge chip of the computer system.

* * * * *